(12) United States Patent
Casanova et al.

(10) Patent No.: US 11,312,627 B2
(45) Date of Patent: Apr. 26, 2022

(54) PHOSPHORUS OXIDE AND PHOSPHORIC ACID PRODUCTION PROCESSES

(71) Applicant: Monsanto Technology LLC, St. Louis, MO (US)

(72) Inventors: Eduardo Aurelio Casanova, University City, MO (US); Peng Fan, St. Louis, MO (US); Justin Robert Struble, Ballwin, MO (US); Jian Xu, Wildwood, MO (US)

(73) Assignee: Monsanto Technology LLC, St. Louis, MO (US)

( * ) Notice: Subject to any disclaimer, the term of this patent is extended or adjusted under 35 U.S.C. 154(b) by 148 days.

(21) Appl. No.: 16/688,159

(22) Filed: Nov. 19, 2019

(65) Prior Publication Data
US 2020/0156944 A1    May 21, 2020

Related U.S. Application Data

(60) Provisional application No. 62/769,252, filed on Nov. 19, 2018.

(51) Int. Cl.
*C01B 25/12*    (2006.01)
(52) U.S. Cl.
CPC .................... *C01B 25/12* (2013.01)
(58) Field of Classification Search
CPC .................... C01B 25/12; C01B 25/20
See application file for complete search history.

(56) References Cited

U.S. PATENT DOCUMENTS

| 4,219,533 A | 8/1980 | Hartlapp et al. |
| 4,603,039 A | 7/1986 | Kuxdorf et al. |

(Continued)

FOREIGN PATENT DOCUMENTS

| DE | 216516 A1 | 12/1984 |
| DE | 288139 A5 | 3/1991 |

(Continued)

*Primary Examiner* — Anthony J Zimmer
(74) *Attorney, Agent, or Firm* — Stinson LLP (57) ABSTRACT

The present invention is generally directed to improved processes for the preparation of various phosphorus oxides and phosphoric acid. Phosphorus oxides prepared in accordance with the present invention include phosphorus (III) oxides (e.g., tetraphosphorus hexaoxide ($P_4O_6$)). Phosphorus (III) oxides such as $P_4O_6$ are useful products and are also useful as precursors in preparation of other products, including phosphorous acid ($H_3PO_3$) and other phosphorus-containing chemicals. Certain aspects of this invention are also directed to using various byproducts formed during $P_4O_6$ production as precursors for the formation of phosphoric acid ($H_3PO_4$) and $P_2O_5$. In particular, the present invention is directed to improved processes for the preparation of phosphorus (III) oxides (e.g., $P_4O_6$) suitable for use in the preparation of phospho-herbicides such N-(phosphonomethyl)glycine (glyphosate) and precursors thereof (e.g., N-(phosphonomethyl)iminodiacetic acid (PMIDA)). The present invention is thus further directed to preparation of these compounds.

21 Claims, 5 Drawing Sheets

(56) References Cited

U.S. PATENT DOCUMENTS

| | | | |
|---|---|---|---|
| 4,608,241 A | 8/1986 | Barber | |
| 4,980,142 A | 12/1990 | McGilvery et al. | |
| 7,976,811 B2 | 7/2011 | Schipper | |
| 8,551,437 B2 | 10/2013 | Schipper | |
| 8,728,427 B2 | 5/2014 | Notte et al. | |
| 2011/0008231 A1* | 1/2011 | Schipper | C01B 25/12 |
| | | | 423/304 |
| 2011/0264267 A1 | 10/2011 | Schipper | |

FOREIGN PATENT DOCUMENTS

| | | | |
|---|---|---|---|
| DE | 292213 A5 | 7/1991 |
| DE | 292636 A5 | 8/1991 |
| DE | 292637 A5 | 8/1991 |
| DE | 3319606 C2 | 2/1992 |

* cited by examiner

PHOSPHORUS OXIDE AND PHOSPHORIC ACID PRODUCTION PROCESSES

CROSS REFERENCE TO RELATED APPLICATIONS

This application claims the benefit of U.S. Provisional Patent Application No. 62/769,252, filed Nov. 19, 2018, the entire contents of which are incorporated herein by reference.

FIELD OF THE INVENTION

The present invention is generally directed to improved processes for the preparation of various phosphorus oxides and phosphoric acid. Phosphorus oxides prepared in accordance with the present invention include phosphorus (III) oxides (e.g., tetraphosphorus hexaoxide ($P_4O_6$)). Phosphorus (III) oxides such as $P_4O_6$ are useful products and are also useful as precursors in preparation of other products, including phosphorous acid ($H_3PO_3$) and other phosphorus-containing chemicals. Certain aspects of this invention are also directed to using various byproducts formed during $P_4O_6$ production as precursors for the formation of phosphoric acid ($H_3PO_4$) and $P_2O_5$. In particular, the present invention is directed to improved processes for the preparation of phosphorus (III) oxides (e.g., $P_4O_6$) suitable for use in the preparation of phospho-herbicides such N-(phosphonomethyl)glycine (glyphosate) and precursors thereof (e.g., N-(phosphonomethyl)iminodiacetic acid (PMIDA)). The present invention is thus further directed to preparation of these compounds.

BACKGROUND OF THE INVENTION

Methods for producing phosphorus (III) oxides such as $P_4O_6$ are known in the art. The term "$P_4O_6$" as used herein is intended to include all formulae conventionally used to define phosphorus (III) oxides, including $P_2O_3$. As used herein, the terms phosphorus (III) oxide and $P_4O_6$ are used interchangeably.

$P_4O_6$ is useful as a product itself and as a precursor for production of various other products. Methods to prepare $P_4O_6$ are known in the art and have proven to some extent to be effective, but there exists room for improvement in terms of yield, purity, and process efficiencies. For example, prior methods for producing $P_4O_6$ typically encounter limitations or issues during scale-up to commercial scale operations.

Both as a product itself and precursor for preparation of other compounds, $P_4O_6$ is often considered in comparison to phosphorus trichloride ($PCl_3$), which is conventionally used in various processes as a source of phosphorus. As a product itself, $P_4O_6$ if produced effectively on a commercial scale would provide an advantage over $PCl_3$ since it would contain a higher weight percent of phosphorus as compared to $PCl_3$ (over 50 weight % as compared to 22 weight %). $P_4O_6$ as a product itself would therefore provide a more concentrated phosphorus product and would avoid the issues and risks associated with the dangerous chemical chlorine required for production of $PCl_3$ and released as a byproduct of its production. These same advantages are provided when $P_4O_6$ is used as an alternative to $PCl_3$ as a precursor for preparing other compounds where, in one form or another (e.g., as hydrochloric acid) large amounts of chlorine are generated as undesired byproducts that must dealt with or disposed. In addition, intermediates and end products to be made from $PCl_3$ usually do not contain chloride. An alternative to $PCl_3$ as a starting material is phosphorous acid. However, phosphorous acid is generally prepared from $PCl_3$ and therefore does not completely avoid the undesired byproduct issue, but simply shifts it to another point in the process.

A need exists, therefore, for improved processes to prepare $P_4O_6$ as a phosphorus-containing product itself and as alternative to $PCl_3$ as a source of phosphorus for use in preparation of various phosphorus-containing compounds.

BRIEF SUMMARY OF THE INVENTION

Briefly, therefore, the present invention is directed to processes for the manufacture of phosphorus (III) oxide.

In various embodiments, the process comprises, in a reactor unit, reacting phosphorus with oxygen, thereby forming an intermediate reaction product stream comprising $P_2O_3$ and one or more byproducts; in a quenching unit, quenching the intermediate reaction product stream by contacting with a quenching liquid, thereby forming a reaction product slurry comprising $P_4O_6$ and one or more byproducts; recovering the one or more byproducts from the reaction product slurry; and in a vaporizer unit, vaporizing the one or more byproducts to form a vaporized recycle stream.

In other embodiments, the process comprises, in a reactor unit, reacting phosphorus with oxygen, thereby forming an intermediate reaction product stream comprising $P_2O_3$ and one or more byproducts; in a quenching unit, quenching the intermediate reaction product stream by contacting with a quenching liquid, thereby forming a reaction product slurry comprising liquid $P_4O_6$ and one or more byproducts; separating solid components of the reaction product slurry therefrom, thereby forming a slurry byproduct stream comprising the one or more solid byproducts and a crude product stream comprising liquid $P_4O_6$; and introducing at least a portion of the slurry byproduct stream into a vaporizer unit.

In still further embodiments of processes for the manufacture of phosphorus (III) oxide, the process comprises, in a reactor unit, reacting phosphorus with oxygen, thereby forming an intermediate reaction product stream comprising $P_2O_3$ and one or more byproducts; in a quenching unit, quenching the intermediate reaction product stream by contacting with a quenching liquid, thereby forming a reaction product slurry comprising liquid $P_4O_6$ and one or more solid byproducts; recovering the one or more solid byproducts from the reaction product slurry; and introducing the one or more solid byproducts into the reactor unit for direct cooling of the contents of the reactor unit, and wherein the temperature within the reactor unit is controlled by external cooling of the reactor unit.

The present invention is also directed to processes for the manufacture of phosphoric acid ($H_3PO_4$).

In certain such embodiments the process comprises reacting phosphorus with oxygen in a reactor unit, thereby forming an intermediate reaction product comprising $P_2O_3$ and one or more byproducts; in a quenching unit, quenching the intermediate reaction product by contacting with a quenching liquid, thereby forming a reaction product slurry comprising liquid $P_4O_6$ and one or more byproducts; separating the reaction product slurry into a crude liquid $P_4O_6$ stream and a thickened product slurry; introducing the crude liquid $P_4O_6$ stream into the quenching unit; separating liquid $P_4O_6$ from the thickened product slurry, thereby forming a crude product stream comprising liquid $P_4O_6$ and a byproduct stream comprising phosphorus (III), phosphorus (V) and/or phosphorus (III and V) oxides; introducing the byproduct stream and oxygen into a vaporizer unit, thereby oxidizing phosphorus oxides present in the byproduct stream to produce a vapor product stream comprising $P_2O_5$ and/or $P_4O_{10}$; and contacting the vapor product stream with water, thereby forming a liquid product stream comprising $H_3PO_4$.

The present invention is also directed to processes for the manufacture of phosphorus pentoxide ($P_2O_5$).

In certain such embodiments, the process comprises reacting phosphorus with oxygen in a reactor unit, thereby forming an intermediate reaction product comprising $P_2O_3$ and one or more byproducts; in a quenching unit, quenching the intermediate reaction product by contacting with a quenching liquid, thereby forming a reaction product slurry comprising liquid $P_4O_6$ and one or more byproducts; separating liquid $P_4O_6$ from the reaction product slurry, thereby forming a crude product stream comprising liquid $P_4O_6$ and a byproduct stream comprising phosphorus (III), phosphorus (V) and phosphorus (III and V) oxides; introducing the byproduct stream and oxygen into a vaporizer unit, thereby oxidizing phosphorus oxides present in the byproduct stream to produce a vapor product stream comprising $P_4O_{10}$; and condensing the vapor product stream, thereby forming a liquid product stream comprising $P_2O_5$.

The present invention is further directed to processes combining the embodiments listed above. For example, any of the embodiments describing processes for the preparation of phosphorus (III) oxide may be combined with the processes for the manufacture of phosphoric acid ($H_3PO_4$) and/or phosphorus pentoxide ($P_2O_5$) described above and/or elsewhere herein.

Other objects and features will be in part apparent and in part pointed out hereinafter.

BRIEF DESCRIPTION OF DRAWINGS

Corresponding reference characters indicate corresponding parts throughout the drawings.

DETAILED DESCRIPTION OF THE INVENTION

The present invention includes improved processes for the production of $P_4O_6$. Improvements embodied in the methods of the present invention include: (i) the suitability of the methods of the present invention for operation on a commercial scale, (ii) improvements in yield, purity, and/or by-product profile for the $P_4O_6$ produced by the methods of the present invention, and (iii) methods for preparation of products using $P_4O_6$ as a precursor that avoid issues associated with other phosphorus-containing precursors (e.g., issues associated with $PCl_3$ due to the use and presence of chlorine).

The processes of the present invention include a combustion step where phosphorus ($P_4$) is reacted with an oxygen-containing gas (typically $O_2$) in a reactor to provide an intermediate product including $P_2O_3$ and one or more byproducts. The $P_2O_3$ is converted to $P_4O_6$ by contact with a quenching liquid in a quenching step. The product of the quenching step includes liquid $P_4O_6$ as a product along with various byproducts, including solid products and also various byproducts dissolved in the liquid phase. The present invention also includes recovery of the $P_4O_6$ from the product of the quenching unit, purification of the $P_4O_6$, and/or use of byproducts of $P_4O_6$ formation in the preparation of another product (e.g., phosphoric acid or phosphorus pentoxide).

Processes of the present invention also may include recovery of a byproduct stream from the $P_4O_6$-containing product of the quenching unit. In one aspect of the present invention, a solid byproduct stream is recovered and returned to the reactor unit. In various other aspects of the present invention, recovery of a byproduct stream (e.g., a mostly solid byproduct stream, or slurry byproduct stream) is followed by vaporization to provide a vaporized recycle stream. Vaporization is conducted in a unit specifically designed therefor and separate from the reactor unit. The vaporized recycled stream is introduced into the reactor as all or a portion of the source of phosphorus for the combustion step.

Overall, recovery of a byproduct stream from the product of the quenching unit improves process efficiencies by recovering phosphorus-containing species that can be converted to $P_4O_6$ and therefore contribute to process yield. These recovered phosphorus-containing species include unconverted phosphorus-containing species and/or may be provided by degradation products of $P_4O_6$. Rather than disposing of these compounds, their value as a source of phosphorus for $P_4O_6$ production is recovered by recycle to the reactor unit.

In accordance with the present invention it has been discovered that the manner of treatment and nature of the recycle stream recovered and returned to the reactor provides significant process benefits. Prior methods have included recycle of a slurry byproduct stream to the reactor unit. However, this has been observed to result in overcooling of the reaction product within the reactor, which in turn lowers the yield during any single pass through the reactor and also prevents any significant recycle of reaction byproducts. Also, temperature control within the reactor unit using a slurry byproduct stream is not reliable due to significant clogging risks (e.g., of pumping mechanism) and may also lead to damage and even complete shut-down of the reactor. In addition, where a slurry byproduct stream is used additional energy requirements are imposed on the reactor. These additional energy requirements result in increased heat load on the reactor. Identifying suitable reactor materials and/or an insulated reactor that can withstand these conditions has proven costly, impractical, and/or cost-prohibitive. For example, commonly used materials such as aluminum oxide ($Al_2O_3$) and silicon carbide have been observed to suffer damage from overheating and/or corrosion caused by the reactants in methods employing slurry recycle.

Use of a vaporous recycle stream prepared in and recovered from a separate vaporization unit specifically selected for treatment of the recycle stream has been discovered to overcome these issues. Utilizing a vaporous recycle stream results in reduced variation in recycle flow rate, little, if any solid vaporization within the reactor unit and the problems associated therewith, and the negative effect(s) on reactor temperature associated with use of a solid byproduct stream. Overall, operation of the process allows for operation of the reactor unit on a more efficient basis in terms of temperature control. Therefore, reactors constructed of conventional materials known in the art (e.g., stainless steel) may be utilized for commercial-scale operations, typically along with direct and/or indirect cooling of the reactor contents as detailed elsewhere herein. Efficient recycle and reactor temperature control also provides improved product ($P_4O_6$) yield. It is also currently believed that utilizing a vaporous recycle stream allows for use of a reactor having a relatively low reactor volume and/or provides greater production of $P_4O_6$ on a unit reactor volume basis.

Reactor Unit

The processes of the present invention generally include the direct reaction of phosphorus and oxygen in a reactor unit designed for this purpose and at stoichiometric ratios. Phosphorus starting material (typically white phosphorus, $P_4$) can be introduced directly into the reactor unit (with or without prior vaporization). In certain embodiments, liquid phosphorus is utilized as a starting material, which is vaporized prior to its introduction into the reactor unit. Phosphorus starting material may also be provided by process streams generated elsewhere in processes of the present invention, including byproduct streams recovered during separation methods (optionally including vaporization of the byproduct stream between recovery and introduction into the reactor unit). In various preferred embodiments, a vaporized recycle stream is introduced into the reactor unit. In accordance with certain such embodiments, the vaporized recycle stream is the lone source of phosphorus introduced into the reactor unit.

Since the stoichiometric ratio of phosphorus:oxygen in $P_4O_6$ is 4:6, generally the molar ratio of phosphorus:oxygen present in the reactor unit is controlled to be near this value. Slight variations are permitted, however, with this ratio typically being from about 4:5.4 to about 4:6.6.

Figure 1:
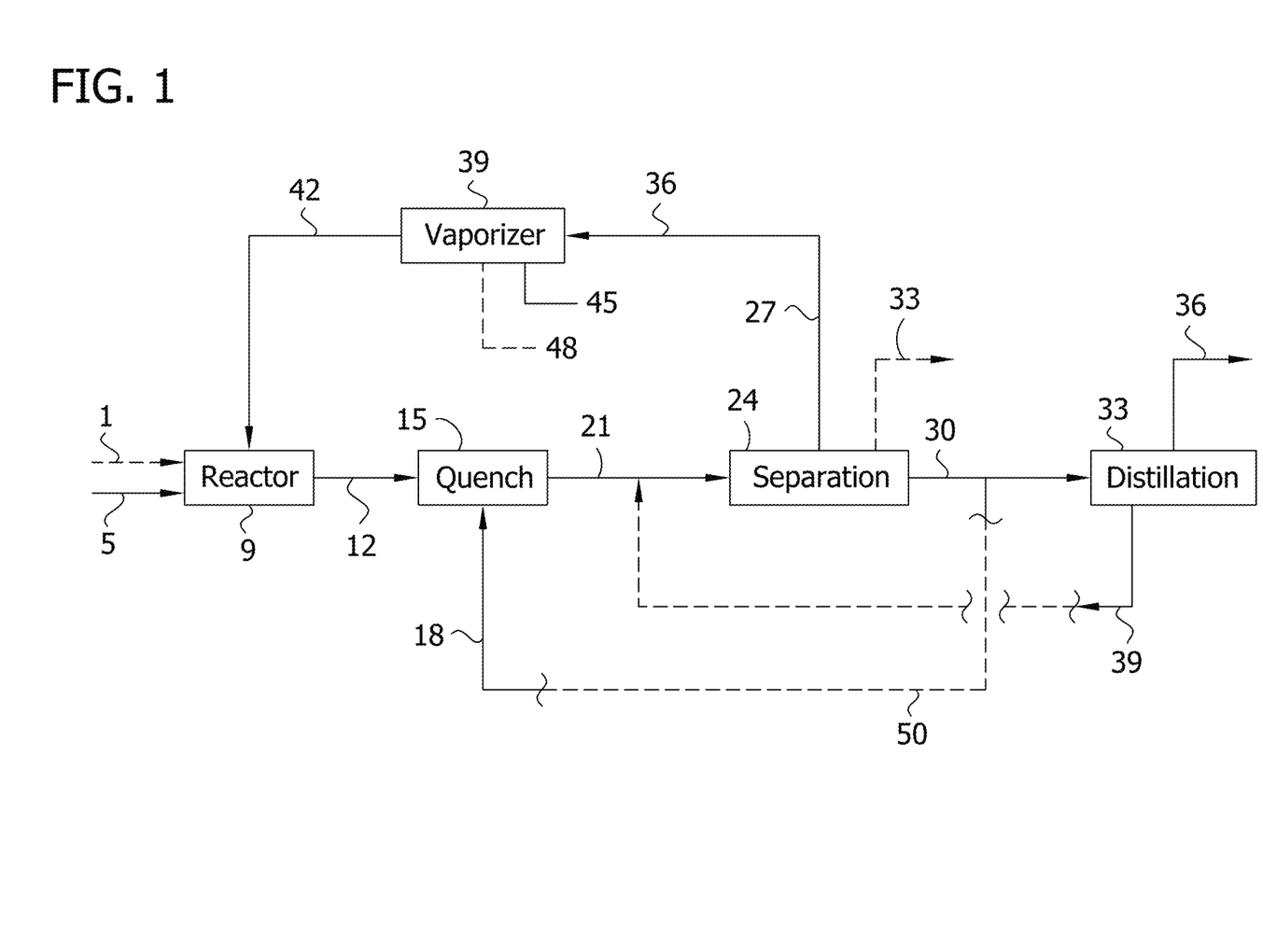
FIG. 1 describes a schematic for a process/processes conducted in accordance with the present invention.

With reference to FIG. 1, phosphorus feed stream 1 and oxygen feed stream 5 are introduced into reactor unit 9. As indicated by dashed lines (and as detailed elsewhere herein), a separate phosphorus source is not required and the lone source of phosphorus for the reactor unit may be recovered elsewhere in the process and recycled to the reactor unit. It is to be understood that the conditions of the reactor depending on the proportion of phosphorus may be determined and controlled by either or both of these sources of phosphorus.

The direct reaction of phosphorus and oxygen is generally conducted in the presence of a flame within the reactor unit. Without cooling, the reactor mixture can reach excessive temperatures, which can result in the production of unwanted oxides of phosphorus (e.g., mixed P(III/V) oxides, phosphorus suboxides, and elemental phosphorus.

Given the highly exothermic nature of the reaction of phosphorus and oxygen, control of the temperature within the reactor unit and therefore the exit temperature of the reaction product recovered from the reactor unit are important aspects of the invention. Generally, the exit temperature of the intermediate reaction product stream as it is recovered from the reactor unit is at least about 1100K. Typically, the exit temperature of the product from the reactor unit is from about 1100 K to about 2200 K, or from about 1500K to about 2200K. Within these temperature ranges, the $P_4O_6$ product is relatively stable, thereby avoiding excessive loss in product yield by, for example degradation to the unwanted byproduct elemental phosphorus. It is currently believed that certain temperature conditions within the above-noted ranges are particularly useful for avoiding product decomposition, including those where the temperature is maintained below about 1800 K (e.g., from about 1500K to about 1800K or from about 1650K to about 1800K).

Providing the desired stoichiometric ratio of phosphorus and oxygen and controlling the temperature conditions within the reactor unit and the exit temperature of the product are dependent on one or more process variables, including phosphorus feed rate, oxygen feed rate, and the feed rate of any recycle stream introduced into the reactor. Generally in accordance with the present invention, any or each of these conditions may be adjusted in response to one of the specified conditions being outside its desired range of values, or in response to the composition of the intermediate reaction product stream recovered from the reactor unit.

Typically, phosphorus is introduced into the reactor unit at a rate of at least about 85 grams/hour, including at rates of from about 85 to about 500 grams/hour or from about 90 grams/hour to about 500 grams/hour.

Oxygen is typically fed to the reactor unit at a rate of at least about 70 grams/hour, including at rates of from about 70 to about 500 grams/hour or from about 80 to about 500 grams/hour.

Generally, where utilized, a vaporous recycle stream is introduced into the reactor unit at a rate of at least about 50 grams/hour, or from about 100 to about 500 grams/hour.

Where necessary to achieve the desired temperature conditions within the reactor and/or the desired exit temperature of the reactor product, the contents of the reactor unit and/or the reactor unit itself may be cooled.

In certain aspects, temperature control may be provided by direct cooling of the reactor contents. Materials suitable for direct cooling include recovered byproducts, reaction slurry recovered from any previous run, and $P_4O_6$ recovered from elsewhere in the process.

Separately, or along with direct cooling the reactor may also be cooled by indirect cooling. Indirect cooling of the reactor unit may be achieved by directly cooling the exterior of the reactor unit (e.g., by blowing cool air onto the exterior of the reactor unit). The reactor unit may also be cooled by surrounding the reactor unit with a bundle of heat exchange tubes for transfer of heat from the contents of the reactor unit to a heat transfer medium for removal of heat from the reactor unit. The selection of the heat transfer medium is not narrowly critical and may include those generally suitable in the art including, for example, air, water, and suitable oils.

Reaction of phosphorus and oxygen in the reactor unit provides a product, often referred to herein as an intermediate reaction product stream comprising $P_2O_3$ and one or more byproducts recovered from the reactor unit.

$P_2O_3$ generally constitutes at least about 60% by weight, at least about 70% by weight, or at least about 80% by weight of the intermediate reaction product stream. Typically, $P_2O_3$ constitutes from about 60 to about 90% by weight, from about 70 to about 90% by weight, or from about 80 to about 90% by weight of the intermediate reaction product stream.

Generally, the one or more byproducts of the intermediate reaction product stream comprise: (i) one or more oxides of phosphorus of the general formula $P_xO_y$, where x is from 1-4 and y is from 1-10, and (ii) one or more other phosphorus species selected from the group consisting of $P$, $P_2$, $P_3$, $P_4$, and combinations thereof.

Typically, the one or more byproducts of the intermediate reaction product stream comprise phosphorus (III) oxides, phosphorus (V) oxides, and phosphorus (III and V) oxides. These byproducts may be selected from the group consisting of $P_4O_7$, $P_4O_8$, $P_4O_9$, $P_2O_5$, and/or $P_4O_{10}$. Additionally, the one or more byproducts of the intermediate reaction product stream may comprise elemental phosphorus ($P_4$) and red phosphorus (P).

As noted, advantageously the processes of the present invention are suitable for $P_4O_6$ production on a commercial scale. It is currently believed that various features of the present invention provide advantageous yields, or payloads in terms of reactor volume as compared to other methods known in the art. Reactor volume is selected to provide the payload desired for the process of interest. The reactor may be constructed of any suitable material known in the art including, for example, stainless steel.

Quenching Unit

Again with reference to FIG. 1, the product of the reactor unit (intermediate reaction product stream) 12 is recovered from the reaction unit and introduced into quenching unit 15 along with quenching liquid 18. As shown in FIG. 1 by the dashed lines, the quenching liquid optionally may be a stream recovered from elsewhere in the process. As depicted in FIG. 1, the quenching liquid is from a product provided by a separation method (detailed elsewhere herein). However, it is to be understood that the quenching liquid can be provided by other product streams generated in the processes of the present invention and/or may also be a dedicated stream introduced into the process solely for use as the quenching liquid.

Quenching of the intermediate reaction product and lowering the temperature of this product stream is important as it serves to avoid undesired decomposition of the $P_4O_6$ product and therefore contributes to effective product yields and purities. Generally, the goal of the quenching step is to lower the temperature of the intermediate reaction product stream to below about 700K, or below about 500K. Typically, this cooling is conducted in a single step by contact with the quenching liquid. Generally the temperature of the quenching liquid is at least about 293K or from about 293K to about 423K.

The precise composition of the quenching liquid is not narrowly critical and in various embodiments is any inert liquid suitable to provide the desired cooling effect. In various embodiments, the quenching liquid does not have solubility in $P_4O_6$, and vice versa. In various embodiments, the quenching liquid comprises liquid $P_4O_6$ and may comprise liquid $P_4O_6$ recovered from a reaction product slurry provided as detailed elsewhere herein.

Contact of the intermediate reaction product stream with the quenching liquid within the quenching unit provides a reaction product slurry comprising liquid $P_4O_6$ and one or more byproducts.

The reaction product slurry has a relatively high $P_4O_6$ content, typically of at least about 70% by weight, at least about 80% by weight, or at least about 90% by weight of the reaction product slurry.

The reaction product from the quenching unit is a slurry including a solids fraction and a liquid fraction. Typically, the liquid fraction of this slurry constitutes at least about 80% by weight, or at least about 90% by weight of the slurry. The slurry typically has a solids content of less than about 20% by weight, or less than about 10% by weight. Therefore, the liquid fraction typically constitutes at least about 80% by weight or at least about 90% by weight of the reaction product slurry.

The reaction product slurry contains one or more byproducts, including: (i) one or more higher oxides of phosphorus of the general formula $P_4O_y$, where y is from 7-9, (ii) lower oxides of phosphorus (e.g., $P_4O$), and/or (iii) elemental phosphorus ($P_4$) and red phosphorus (P). At least a portion of the byproducts are solid while a portion of the byproducts are distributed through the liquid fraction of the slurry.

Overall, therefore, the process stream recovered from the quenching unit is generally in the form of a mixture or slurry of a relatively high moisture content along with a solids fraction generally constituted by one or more solid byproducts of the reaction of phosphorus and oxygen. As detailed elsewhere herein, byproducts are useful for recycle to the reactor unit to contribute to direct cooling of the contents of the reactor unit. Thus, various aspects of the present invention involve recovery from, or separation of the solid products from the reaction product slurry.

Separation Unit(s)

Again with reference to FIG. 1, reaction product slurry 21 is recovered from the quenching unit 15 and introduced into separation unit 24. Although shown singly in the schematic of FIG. 1, it is to be understood that a "separation unit" in accordance with the separation methods described herein may involve multiple unit operations or apparatus. Overall, however, the purpose of the use of a separator unit is providing at least two outputs: a byproduct stream 27 and a crude $P_4O_6$ product stream 30, as shown in FIG. 1.

A first step in separation is typically removal of a portion of the liquid phase of the reaction product slurry. The precise method for removal of a portion of the liquid phase at this stage is not narrowly critical and may be conducted, for example, by heating the reaction product slurry, including heating to a temperature of at least about 90° C. or at least about 100° C. or from about 100° C. to about 500° C.

Given its solids content and after having liquid removed therefrom the reaction product slurry may therefore be referred to herein as a thickened product slurry. The recovered liquid phase can be recycled back to the quenching unit and/or a portion may be sent to a distillation step (described elsewhere herein).

Generally, $P_4O_6$ constitutes at least about 80% by weight, at least about 90% by weight, or at least about 95% by weight of the thickened product slurry. The thickened product slurry typically has a moisture content of less than about 80% by weight or less than about 70% by weight. Concomitantly, the thickened product slurry has a solids content of at least about 20% by weight or at least about 30% by weight.

A fraction comprising liquid and solid components of the thickened product is recovered from the thickened product slurry. This fraction is shown as byproduct stream 27 in FIG. 1. A crude product stream comprising $P_4O_6$ (shown as 30 in FIG. 1) remains after recovery of the solids fraction from the thickened product slurry. The solids fraction may be recovered from the thickened product slurry in accordance with conventional solid-liquid separation apparatus known in the art including, for example, a hydrocyclone, a centrifuge, a filtration apparatus, or an evaporative apparatus.

In various other embodiments, a crude product stream is recovered from the thickened product slurry and the entire remaining slurry—the thickened product slurry, or thickened recycle stream is recycled to a vaporizer unit (detailed elsewhere herein).

As noted above, one output from the separation unit is a byproduct-containing stream, which is treated to provide a recycle stream (e.g., a vaporized recycle stream as detailed elsewhere herein) for returning to the reactor unit, as detailed elsewhere herein. Generally speaking, byproduct stream 27 may be recovered in the form of a slurry byproduct stream or in the form of a solid byproduct stream. The former case of a slurry byproduct stream typically contains a solid phase containing byproducts along with a liquid phase throughout which the solid phase is dispersed. In certain embodiments, a slurry byproduct stream may be further treated by removal of liquid therefrom to form a byproduct stream that is essentially a solids fraction having most or nearly all the liquid removed therefrom.

Therefore, in certain embodiments, from the thickened product slurry 21 is recovered a solids fraction 33, a crude product stream comprising $P_4O_6$ 30, and slurry byproduct stream 27. In various other embodiments, a solid byproduct stream is desired for further treatment and recycle to the reactor unit. In these embodiments, the slurry byproduct stream is dried to provide a solid byproducts stream.

Any solid byproduct stream generated typically has a moisture content of less than about 5% by weight, less than about 3% by weight, or less than about 1% by weight. Both a solid byproduct stream and a slurry byproduct stream may be treated in a vaporizer unit as detailed elsewhere herein, generally to provide a vaporized recycle stream for introduction back into the reactor unit.

Overall, therefore, operations within the broadly-defined "separation unit" can include: (i) removing liquid from the reaction product slurry to provide a thickened product slurry; and (ii) separating solid components of the thickened product slurry therefrom, thereby forming a slurry byproduct stream comprising the one or more solid byproducts and a crude product stream comprising $P_4O_6$. Such operations may also include: (i) removing liquid from the reaction product slurry to provide a thickened product slurry; (ii) separating solid components of the thickened product slurry therefrom, thereby forming a slurry byproduct stream comprising the one or more solid byproducts and a crude product stream comprising $P_4O_6$; and (iii) drying the slurry byproduct stream, thereby forming the one or more solid byproducts.

The crude product stream comprising $P_4O_6$ contains $P_4O_6$ and also typically contains $P_4O_7$ and $P_4O_9$. $P_4O_6$ typically constitutes at least about 80% by weight or at least about 90% by weight of the crude product stream. The crude product stream comprising $P_4O_6$ may also contain a liquid fraction.

Again with reference to FIG. 1, a second solids fraction may be recovered from the separation unit, optionally (dashed lines) shown as 33. This solids fraction may be separately recovered from the thickened product slurry itself or may be a portion of a slurry byproduct stream or a solids byproduct stream recovered as detailed elsewhere herein. If recovered, this solids fraction is treated as detailed elsewhere herein.

Vaporizer Unit

Generally, various processes of the present invention involve vaporizing, or treating in a vaporizer a byproduct stream recovered from the product of the quenching operation. This treatment provides a vaporized recycle stream generally comprising one or more phosphorus oxides (e.g., $P_4O_{10}$, or one or more phosphorus oxides of the general formula $P_xO_y$). The vaporized recycle stream is introduced into the reactor unit and may be combined with another source of phosphorus starting material or may be the lone source of phosphorus starting material introduced into the reactor unit. Again with reference to FIG. 1, byproduct stream 27 becomes vaporizer feed stream 36 that is introduced into vaporizer unit 39 to form vaporized recycle stream 42. Vaporizer feed steam may be in the form of a solid byproduct stream, or slurry byproduct stream with each situation detailed below.

Solid Byproducts

Overall, a solid byproduct stream recovered by separation operations as detailed elsewhere herein includes solid byproducts and a moisture fraction. Generally, the solid byproducts have a moisture content of less than about 30% by weight, less than about 20% by weight, or less than about 10% by weight. In certain embodiments, the solid byproducts have a moisture content of less than about 5% by weight, less than about 3% by weight, or less than about 1% by weight. The solid byproducts generally comprise: (i) one or more higher oxides of phosphorus of the general formula $P_4O_y$, where y is from 7-9, (ii) lower oxides of phosphorus such as $P_4O$, and/or (iii) elemental phosphorus ($P_4$) and red phosphorus (P). Solid byproduct containing streams described herein may contain any or all of these byproducts.

Vaporization of the solid byproducts generally proceeds in the presence of an oxygen-containing gas and at elevated temperatures. Generally, the temperature within the vaporizer unit is at least about 773K. Often, the temperature within the vaporizer unit is at least about 1000K, or at least about 1100K and generally controlled at between 1200 K and 1770K. Typically, the temperature within the vaporizer unit is controlled at between 1200K and 1500K. Overall, the components of the vaporizer feed stream are vaporized at temperatures of greater than 1000K, greater than 1100K, or greater than 1200K.

Again with reference to FIG. 1, oxygen-containing gas 45 is introduced into the vaporizer unit. Suitable oxygen-containing gases include air and blends of oxygen and nitrogen. Where a blend of oxygen and nitrogen is employed, typically the amount of nitrogen is controlled to be a relatively minor portion of the gas stream to avoid over-cooling within the vaporizer unit. In various embodiments, only oxygen, or an oxygen-containing gas is introduced into the vaporizer unit along with the solid byproduct stream.

Vaporizing the solid byproduct stream by contact with an oxygen-containing gas in the vaporizing unit provides a vaporized recycle stream including $P_4O_{10}$. Other phosphorus oxides of the general formula $P_xO_y$ may also be present in the vaporized recycle stream, but the predominant phosphorus oxide is $P_4O_{10}$. More specifically, in accordance with such embodiments, typically $P_4O_{10}$ constitutes at least about 40 weight % or at least about 50 weight % of the phosphorus oxides in a vaporized recycle stream where only an oxygen-containing gas is introduced into the vaporizer unit along with the solid byproduct stream.

It is currently believed that operating the vaporizer unit under certain conditions promotes a vaporized recycle stream where a substantial portion or nearly all of the phosphorus oxide species are constituted by $P_4O_{10}$. These conditions include a ratio of mass flow rates for the oxygen-containing gas and the one or more byproducts introduced into the vaporizer unit is from about 1:10 to about 10:1; and/or the temperature of the oxygen-containing gas introduced into the vaporizer unit of at least about 270K (e.g., from about 270K to about 500K, or from about 300K to about 500K); and/or the temperature of the one or more solid byproducts introduced into the vaporizer unit is at least about 270K (e.g., from about 270K to about 500K, or from about 300K to about 500K).

Under certain temperature conditions in the vaporizer unit, formation of the phosphorus oxide $P_2O_5$ results. To provide a vaporized recycle stream including $P_2O_5$ (optionally meeting the listed compositional limitations) the temperature within the vaporizer unit is controlled at from about 1200K to about 1500K.

An additional source of phosphorus may be introduced into the vaporizer unit along with the solid byproducts and oxygen-containing gas, shown (optionally by dashed lines)

as 48 in FIG. 1. The additional phosphorus source (e.g., $P_4$) is generally believed to conduce formation of a broader complement of phosphorus oxides in the vaporized recycle stream, specifically one or more oxides of phosphorus of the general formula $P_xO_y$, where x is from 2 to 4 and y is from 6-10.

For providing a vaporized recycle stream having a composition defined in such a manner, typically one or more of the following conditions are met: the ratio of mass flow rates for the oxygen-containing gas and the one or more byproducts introduced into the vaporizer unit is from about 1:10 to about 10:1; and/or the ratio of mass flow rates for the phosphorus ($P_4$) and the one or more byproducts introduced into the vaporizer unit is from about 1:10 to about 10:1; and/or the temperature of the oxygen-containing gas introduced into the vaporizer unit is at least about 270K (e.g., from about 270K to about 500K, or from about 300K to about 500K); and/or the temperature of the one or more byproducts introduced into the vaporizer unit is at least about 270K (e.g., from about 270K to about 500K, or from about 300K to about 375K).

The temperature of the vaporized recycle stream typically is at least about 1000K, or at least about 1100K. In various embodiments, the temperature of the vaporized recycle stream is from about 1000K to about 2000K, or from about 1200K to about 2000K. Although generally vaporous in nature, the vaporized recycle stream may contain a minor solids fraction of less than about 5 weight %.

Again with reference to FIG. 1, the vaporized recycle stream 42 is introduced into the reactor unit 9. The vaporized recycle stream may be the lone source of phosphorus reacted with oxygen in the reactor unit. Therefore, the phosphorus starting material 1 shown in FIG. 1 is optional (indicated by dashed lines) and in certain embodiments not included.

As detailed elsewhere herein, control of the conditions within the reactor unit is important in order to provide the reaction product with an exit temperature that avoids substantial decomposition of the desired product. Another purpose of addition of the vaporized recycle stream into the reactor unit therefore is direct cooling of the contents of the reactor unit. Therefore, in accordance with the present invention, the temperature within the reactor unit may be controlled by direct cooling of the reactor contents, with direct cooling comprising introducing a vaporized recycle stream into the reactor unit.

Slurry Byproduct

Further in accordance with the present invention, and with reference to FIG. 1, byproduct stream 27 may be a slurry that is introduced into the vaporizer unit to provide a vaporized recycle stream that is introduced into the reactor unit. Typically, the slurry byproduct stream includes a liquid fraction that constitutes from about 5% by weight to about 50% by weight of the slurry byproduct stream.

The slurry byproduct stream typically contains a significant fraction of solid byproducts (i.e., (i) one or more higher oxides of phosphorus of the general formula $P_4O_y$, where y is from 7-10, (ii) lower oxides of phosphorus such as $P_4O$, and/or (iii) elemental phosphorus ($P_4$) and red phosphorus (P)).

An oxygen-containing gas (and optionally an additional source of phosphorus (e.g., $P_4$)) is introduced into the vaporizer unit along with the slurry byproduct.

Where a slurry byproduct stream is recovered and sent to a vaporizer unit to provide vaporized recycle stream for use in the reactor unit, one or more conditions of operation of the vaporizer unit may be controlled in order to provide a vaporized recycle stream having one or more desirable features. Typically, the ratio of mass flow rates for the oxygen-containing gas and the slurry byproduct introduced into the vaporizer unit is from about 1:10 to about 10:1; and/or the ratio of mass flow rates for the phosphorus ($P_4$) and the slurry byproduct introduced into the vaporizer unit is from about 1:10 to about 10:1; and/or the temperature of the oxygen-containing gas introduced into the vaporizer unit is at least about 270K (e.g., from about 270K to about 500K, or from about 300K to about 500K); and/or the temperature of the one or more byproducts introduced into the vaporizer unit is at least about 270K (e.g., from about 270K to about 500K, or from about 300K to about 375).

A vaporized recycle stream provided by a slurry byproduct stream introduced into the vaporizer typically contains phosphorus oxides of the general formula $P_xO_y$, where x is from 1-4 (e.g., 2-4) and y is from 1-10 (e.g., 6-10). The temperature of such a vaporized recycle stream typically is from about 750K to about 1700K. Although generally vaporous in nature, the vaporized recycle stream may contain a minor solids fraction constituting less than about 5 weight %.

One purpose of introduction of such a vaporized recycle stream is to provide a source of phosphorus for reaction with oxygen within the reactor unit, and the vaporized recycle stream may be the lone source of phosphorus reacted with oxygen in the reactor unit.

The purpose of the vaporized recycle stream may also be direct cooling of the reactor contents to provide a product recovered from the reactor unit at a desired exit temperature.

Regardless of the precise nature of the byproduct stream introduced into the vaporizer unit, reaction therein is exothermic. Typically, the vaporizer unit may be externally cooled.

Solid Byproducts Recycle to Reactor Unit

Figure 2:
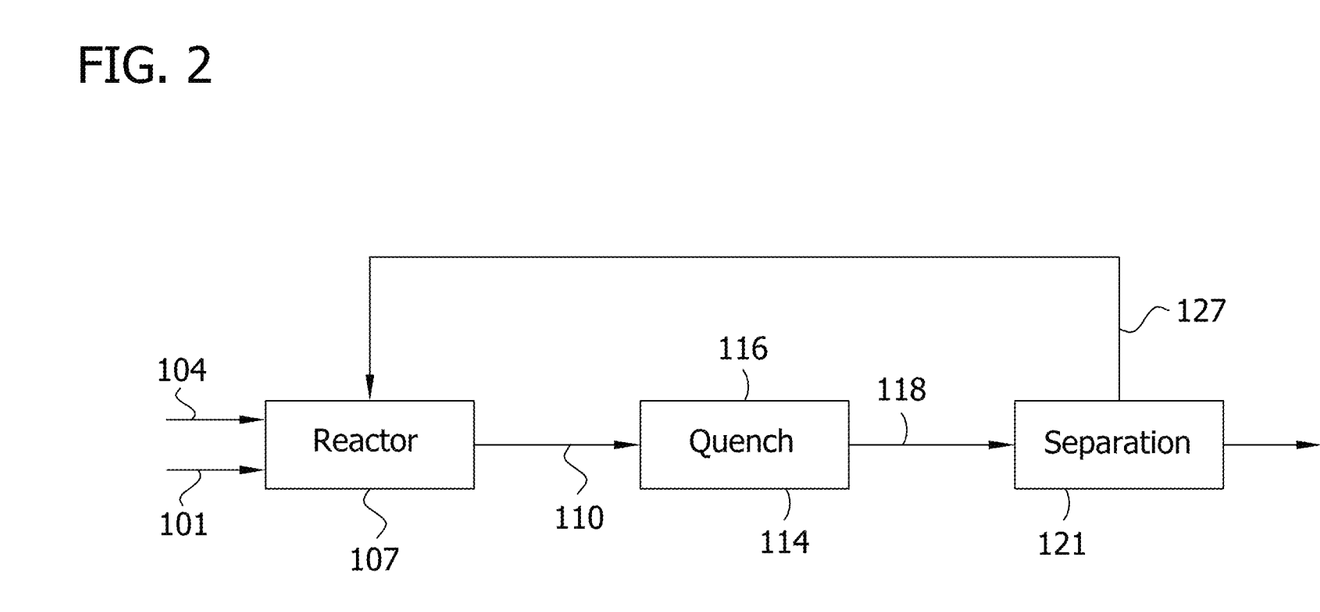
FIG. 2 describes a schematic for a process conducted in accordance with the present invention.

In certain embodiments of the present invention, a solid byproduct stream is recovered from a separator unit and recycled to the reactor unit without treatment in a vaporizer unit. With reference to FIG. 2, oxygen-containing gas 101 and phosphorus source 104 are introduced into reactor unit 107 to form intermediate reaction product stream 110. This product stream is introduced into quenching unit 114 and contacted with quenching liquid 116 to form a reaction product slurry 118 comprising $P_4O_6$ and one or more solid byproducts. The reaction product slurry is introduced into the separator unit 121 for recovery of a solid byproduct recycle stream 127 for recycle to reactor unit 107. The solid byproduct stream is recovered from the reaction product by a suitable method known in the art.

Recycle of the solid byproducts to the reactor unit provides a source of phosphorus for reaction within the reactor unit and also provides some direct cooling of the reactor contents. The direct cooling of the reactor contents by introduction of the solid byproducts may not be sufficient to control the temperature such that a product of the desired exit temperature for release from the reactor unit is provided. In accordance with the present invention it has been discovered that the temperature conditions within the reactor unit may be controlled by further employing external cooling of the reactor unit.

Advantageously in accordance with the present invention it has been discovered that combining direct cooling of the reactor unit contents by introducing solid byproducts thereto along with external cooling of the reactor unit allows for improved yield, decreased decomposition, and better temperature control within the reactor unit. In addition, conventional reactor materials could be used for construction as excessive heating is not caused due to combined better control of external cooling and controlled internal cooling Typically, the solid byproducts recovered from the reaction product slurry comprise: (i) one or more oxides of phosphorus of the general formula $P_4O_y$, where y is from 7-10, (ii) lower oxides of phosphorus such as $P_4O$, and/or (iii) elemental phosphorus ($P_4$) and red phosphorus (P).

Typically, the solid byproducts recovered from the reaction product slurry have a moisture content of less than about 30% by weight, less than about 20% by weight, less than about 10% by weight, or less than about 5% by weight.

Aside and apart from any temperature control aspect, typically the rate of addition of the one or more solid byproducts into the reactor unit is controlled to maintain the molar ratio of P:O within the reactor unit at from about 4:5.4 to about 4:6.6.

Where the solid byproducts are not the lone source of phosphorus introduced into the reactor unit, generally the relative proportions of solid byproducts, other phosphorus source, and oxygen introduced into the reactor unit may be controlled in order to provide the desired conditions within the reactor unit. Typically, the ratio of the mass flow rates of the one or more solid byproducts and phosphorus introduced into the reactor unit is at least about 0.2:1 or from about 0.3:1 to about 1:1. The ratio of the mass flow rates of the one or more solid byproducts and oxygen introduced into the reactor unit is at least about 0.25:1 or from about 0.4:1 to about 1:1.4.

Phosphorus (III) Oxide Product Recovery and Purification

Again with reference to FIG. 1, a crude product stream comprising $P_4O_6$ (crude product stream) 30 is recovered from the separator unit and subjected to one or more purification methods to provide a purified final product. The crude product stream, obtained after recovery of a byproduct stream (e.g., a solid byproduct or slurry byproduct stream) from an upstream phosphorus (III) oxide containing stream includes a liquid fraction along with a solids fraction. The crude product stream therefore comprises liquid $P_4O_6$. Generally speaking, $P_4O_6$ constitutes at least about 80% by weight or at least about 90% by weight of the crude product stream. The crude product stream may also have a solids fraction including one or more solid byproducts. Since the byproduct and solids fractions include minimal $P_4O_6$, generally speaking the crude product stream is enriched in $P_4O_6$ content as compared to the upstream process streams by virtue of removal of fractions of minimal, if any $P_4O_6$ content (e.g., the solid and/or slurry byproduct stream recovered and subjected to one or more operations as detailed elsewhere herein).

For recovery of a purified $P_4O_6$ product, the crude product stream is purified by one or more operations. In various embodiments, the crude product stream is distilled. Generally in accordance with such embodiments, and again with reference to FIG. 1, the crude product stream is introduced into distillation zone 33.

The crude product stream, generally in the form of a liquid phase containing dissolved $P_4O_6$ and a minor impurity fraction is introduced into the distillation zone and subjected to elevated temperature conditions to form an overheads fraction and a bottoms fraction. The overheads fraction includes $P_4O_6$ and the solids fraction comprises solid byproducts. The overheads fraction comprising $P_4O_6$ is condensed to form a liquid $P_4O_6$ product. Suitable distillation methods include those generally known in the art.

The final, liquid $P_4O_6$ product of the present invention may be characterized by any or all of the following features: (i) a yield of at least 90%, at least 95%, or at least 99% based on the total amount of phosphorus introduced into the reactor unit; and/or (ii) a $P_4O_6$ purity of at least about 90%, at least 95%, or at least 99%; and/or (iii) an elemental phosphorus ($P_4$) content of no more than about 10 wt % or no more than about 5 wt %; and/or (iv) as essentially free of elemental phosphorus ($P_4$).

The bottoms fraction may be recovered and disposed of or may be re-introduced at one or more points in the process in the hope of recovering value from any phosphorus-containing species that may be present in the fraction. For example, in certain embodiments, a portion of the bottoms fraction 39 comprising solid byproducts may be combined with the reaction product slurry prior to its introduction into the separation unit 24.

Additionally or alternatively, at least a portion of the bottoms fraction comprising solid byproducts may be combined with solid byproducts recovered from the thickened product slurry (not shown in FIG. 1) to form a combined solid byproducts stream. At least a portion of the combined solid byproducts stream thus formed may be introduced into the vaporizer unit.

Again with reference to FIG. 1, in certain embodiments a portion of the crude product stream 50 is returned to the quenching unit 15.

Alternative Phosphorus Oxide and Phosphoric Acid Production

As noted elsewhere herein, the present invention is further directed to processes for the preparation of phosphorus oxides other than $P_4O_6$ including, for example, $P_2O_5$. Certain processes of the present invention also include preparation of phosphoric acid. Generally in accordance with such embodiments of the present invention, the starting material is a solids-containing byproduct stream recovered during separation of a crude product stream and solid byproducts. Again with reference to FIG. 1, the starting material 33 is treated as discussed herein with reference to FIG. 3 (phosphoric acid) and FIG. 4 ($P_2O_5$). Each of these processes may be combined with one or more of the processes detailed herein, including those described in FIGS. 1 and 2.

Generally in accordance with the present invention, preparation of phosphoric acid involves vaporizing a solid byproduct stream, followed by hydrating of the vaporized stream to form a liquid product comprising phosphoric acid.

Figure 3:
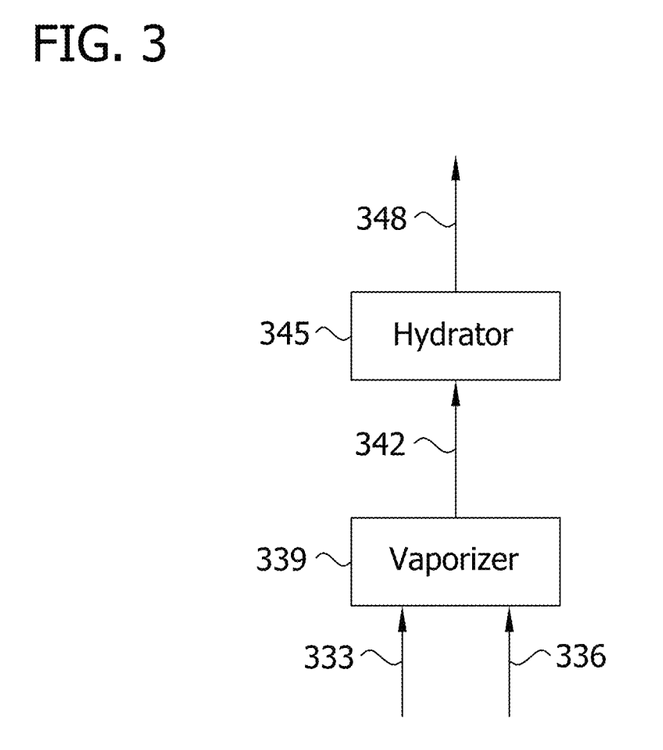
FIG. 3 describes a schematic for a process conducted in accordance with the present invention.

With reference to FIG. 3, the solid stream 333 is combined with an oxygen-containing gas 336 in vaporizer 339.

The ratio of mass flow rates for the oxygen-containing gas and the solid stream introduced into the vaporizer unit is from about 1:10 to about 10:1; and/or the temperature of the oxygen-containing gas introduced into the vaporizer unit is at least about 270K (e.g., from about 270K to about 500K, or from about 300K to about 500K); and/or the temperature of the solid stream introduced into the vaporizer unit is at least about 270K (e.g., from about 270K to about 500K, or from about 300K to about 500K).

Generally, the temperature within the vaporizer unit is at least about 773K. Often, the temperature within the vaporizer unit is at least about 1000K, or at least about 1100K. Overall, the temperature within the vaporizer unit typically is controlled at between 1200 K and 1770K. Typically, the temperature within the vaporizer unit is is controlled at between 1200 K and 1500 K. Typically, the components of the vaporizer feed stream are vaporized at temperatures of greater than 1000K, greater than 1100K, or greater than 1200K.

From the vaporizer unit 339 is recovered a vapor product stream 342 containing $P_2O_5$ and/or $P_4O_{10}$.

The vapor product stream 342 is then introduced into a hydrator 345, wherein the vapor is contacted with water to form phosphoric acid.

Generally, the ratio of the mass flow rates for the vapor product stream and water present in the hydrator is from about 1:10 to about 10:1.

Figure 4:
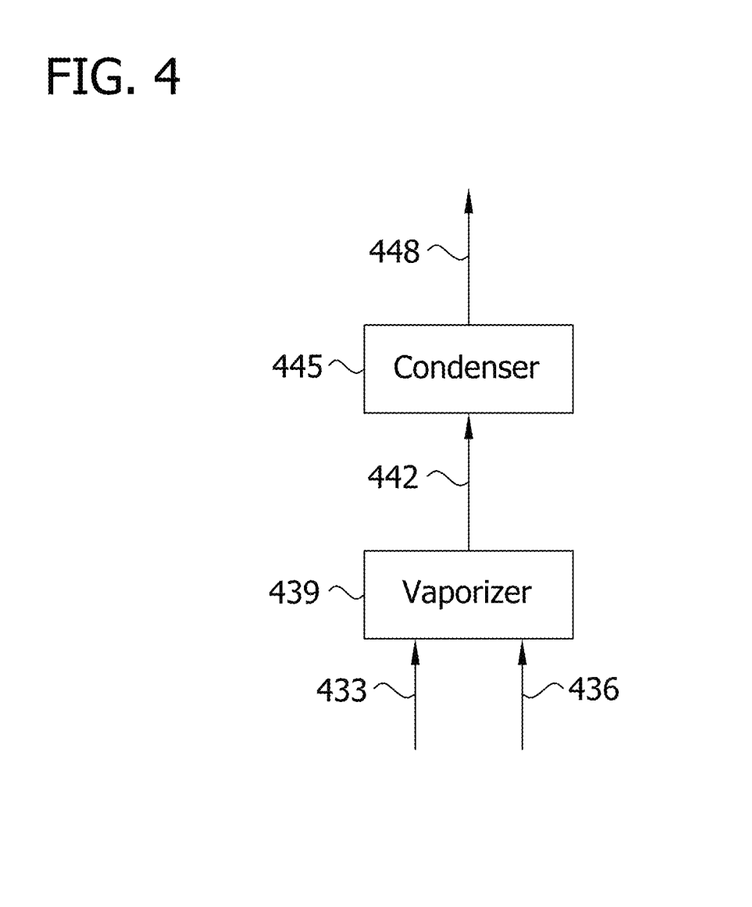
FIG. 4 describes a schematic for a process/processes conducted in accordance with the present invention.
Figure 5:
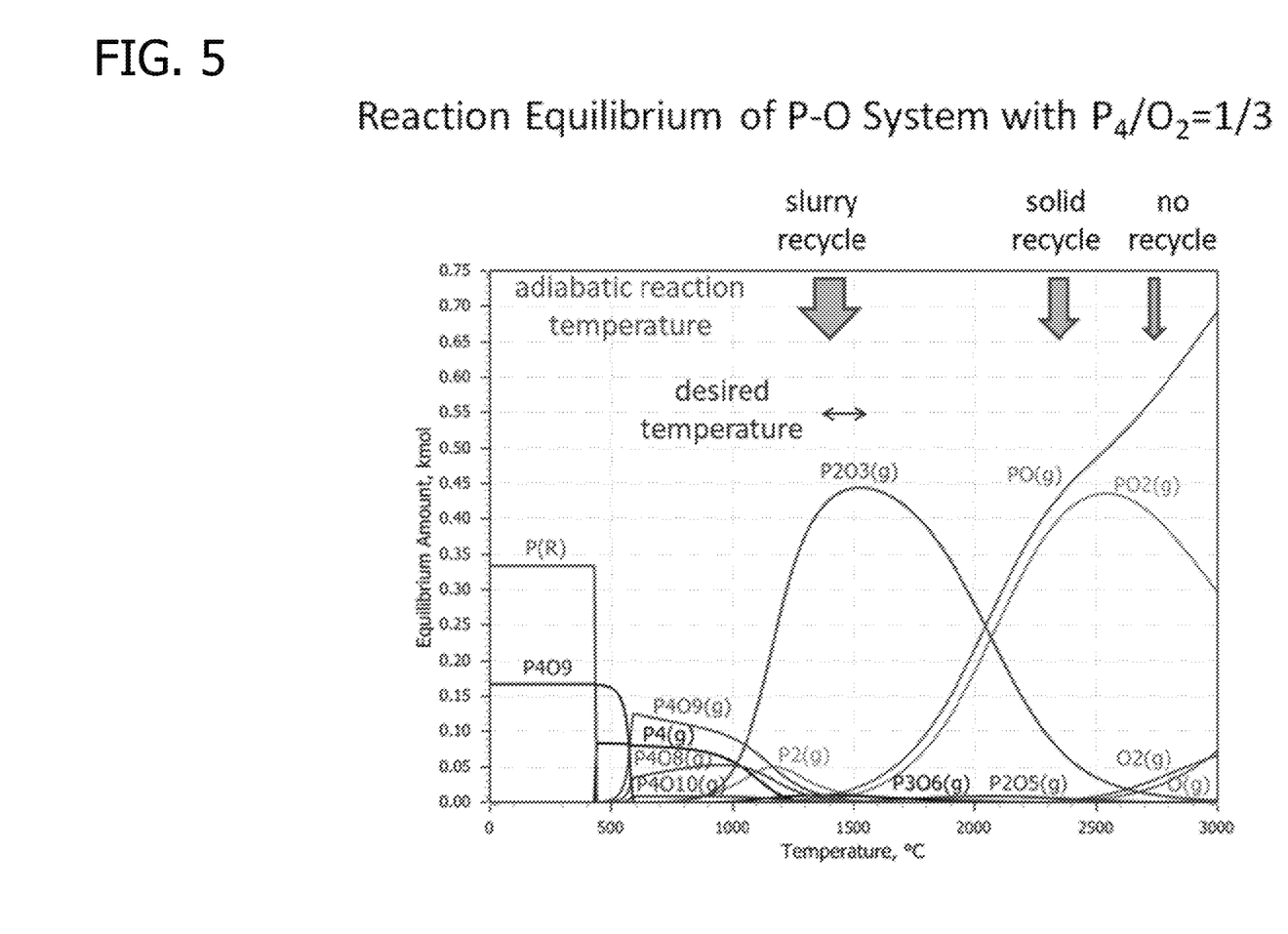
FIG. 5 depicts the thermodynamic equilibrium of a phosphorus-oxygen (P—O) system for a molar ratio of $P_4:O_2$ of 1:3 using software modeling (HSC—http://www.hsc-chemistry.com).

With reference to FIG. 4, the solid product stream 433 is combined with oxygen 436 in vaporizer unit 439 to provide a vapor product stream 442. The conditions within the vaporizer unit and the composition of vapor product stream 442 are generally the same as those set forth above.

The vapor product stream 442 is introduced into a condenser 445 to provide product stream 448 comprising $P_2O_5$.

Preparation of Phospho-Herbicides

As previously noted, certain embodiments of the present invention involve use of phosphorus (III) oxides (e.g., $P_4O_6$) and other products obtained from the processes of the present invention (e.g., phosphorous acid) in processes for the preparation of phospho-herbicides such N-(phosphonomethyl)glycine (glyphosate) and precursors thereof (e.g., N-(phosphonomethyl)iminodiacetic acid (PMIDA)).

Processes for making PMIDA are known in the art and include those in which an alkali metal salt of iminodiacetic acid (IDA), a strong mineral acid, and a source of phosphorous acid are reacted. The disodium salt of IDA (DSIDA) is preferred. Suitable strong mineral acids include sulfuric, hydrobromic, hydroiodic and hydrochloric with hydrochoric generally preferred. In conventional methods, phosphorous acid can be added to the reaction medium or generated in situ by the hydrolysis of $PCl_3$. In such methods, $PCl_3$ is hydrolyzed to phosphorus acid in the DSIDA solution. HCl, which results from hydrolysis of phosphorous trichloride, acidifies the DSIDA to afford the hydrochloride salt and NaCl. Water vapor and a fraction of the HCl may be evolved from the reaction mixture and recovered in a hydrolysis reactor condenser. Optionally, a fraction of HCl driven from the reaction may be recycled to a subsequent batch. The IDA hydrochloride salt and NaCl are both substantially insoluble and form a slurry in an aqueous solution which is saturated with HCl. In a second step, the hydrolyzate slurry containing the strong acid salt of iminodiacetic acid, sodium chloride, hydrochloric acid and phosphorous acid is transferred from the hydrolyzer to a phosphonomethylation (PM) reactor. In the PM reactor, the slurry is combined with a source of formaldehyde to produce a PM reaction mixture containing PMIDA.

The present invention includes methods where $P_4O_6$ prepared in accordance with any of the methods described herein is utilized for the in situ preparation of phosphorous acid, thus avoiding the issues associated with $PCl_3$ detailed elsewhere herein. Such methods generally proceed as described above with the $PCl_3$ replaced by the $P_4O_6$.

The present invention is further directed to methods where $P_4O_6$ prepared or recovered as described herein is utilized in a method for preparing PMIDA in a method that does not require the use of a strong mineral acid (e.g., hydrochloric acid). In such methods, $P_4O_6$ is hydrolyzed to form phosphorous acid, which is then reacted with formaldehyde and IDA to form PMIDA. In addition to avoiding the use of $PCl_3$ and the issues associated therewith, these methods therefore further avoid the issues associated with the use of hydrochloric, including the generation of chloride byproducts.

The present invention is further directed to methods where PMIDA prepared as described herein is converted to N-(phosphonomethyl)glycine in accordance with methods generally known in the art.

Having described the invention in detail, it will be apparent that modifications and variations are possible without departing from the scope of the invention defined in the appended claims.

EXAMPLES

The following non-limiting examples are provided to further illustrate the present invention.

Example 1: $P_4O_6$ Process with Byproducts Vaporization

A stream (99 g/h) of liquid elemental phosphorus $P_4(l)$ is pumped from a phosphorus storage tank (maintained at a temperature of approximately 323K) into a phosphorus evaporator (a tube furnace maintained at around 773K) and converted into a vaporous elemental phosphorus $P_4(g)$ stream. The vaporous elemental phosphorus stream is injected into a vaporizer (an externally cooled stainless steel chamber), and reacted exothermically with a stream of oxygen gas ($O_2$) (77 g/h) that is also injected into the vaporizer to form a vaporous mixture of phosphorus oxides.

Concurrently, a stream of solid byproducts obtained from previous experiments (176 g/h) is fed into a vaporizer and vaporized by the reaction heat of $P_4+O_2$ into a separate vaporous mixture of various phosphorus oxides.

The vaporous mixtures of phosphorus oxides prepared from solid byproducts are injected into a reactor (an externally cooled or externally plus internally cooled stainless steel chamber) along with the resultant stream of vaporous mixture of phosphorus oxides prepared from elemental phosphorus along with a stream of oxygen gas ($O_2$) (230 g/h) and another stream of vaporous phosphorus $P_4(g)$ (297 g/h) (generated from another phosphorus evaporator) are injected into a reactor, where they react to form a hot reaction product stream.

The heat removal from the reactor is controlled by the external cooling or external cooling plus internal cooling to ensure that the exit temperature of the hot reaction product stream is maintained at around 1710K so that the dominant species in the hot reaction product is the desired phosphorus trioxide $P_2O_3(g)$.

Upon exiting the reactor, the hot reaction product stream is quenched in a quench unit by mixing it with a quench fluid. The quench liquid is a stream of liquid $P_4O_6(l)$ (44,400 g/h) obtained from previous experiments.

The quenched product and the quench fluid are collected as a mixture (slurry) of liquid $P_4O_6(l)$ and solid byproducts at the bottom the quench unit. With a hydrocyclone, the slurry is divided into two streams, one is a stream of thickened slurry and the other is a stream of clarified crude $P_4O_6$ product.

With a filtration unit or a centrifuge, the solid-liquid separation of the thickened slurry leads to a stream of solid byproducts and a stream of liquid crude $P_4O_6$ that contains some soluble byproducts.

The liquid crude $P_4O_6$ stream is purified using an evaporative distillation unit to provide 704 g/h purified product $P_4O_6$, while the soluble byproducts is precipitated from crude $P_4O_6$ to form solid distillation residue at the bottom of the distillation unit.

The purified product $P_4O_6$ has a purity of greater than 99 weight %. The $P_4O_6$ yield on $P_4$ introduced into the reactor unit is greater than 99%.

Example 2: $P_4O_6$ Process with Conversion of $P_xO_y$ to $H_3PO_4$ or $P_2O_5$ A stream of liquid elemental phosphorus $P_4(l)$ (500 g/h) is pumped from a phosphorus storage tank (maintained at a temperature of approximately 323K) into a phosphorus evaporator (a tube furnace maintained at around 773K) and converted into vaporous elemental phosphorus $P_4(g)$. The $P_4(g)$ stream and a stream of oxygen gas ($O_2$) (387 g/h) are injected into a reactor (an externally cooled or externally plus internally cooled stainless steel chamber), where they react into a stream of hot reaction product. The heat removal from the reactor is controlled by the external cooling or external plus internal cooling to ensure that the exit temperature of the hot reaction product stream is maintained at around 1710K so that the dominant species in the hot reaction product is the desired phosphorus trioxide $P_2O_3(g)$.

Upon exiting from the reactor, the hot reaction product stream is quenched in a quench unit by mixing it with a quench fluid. The quench fluid is a stream of liquid $P_4O_6(l)$ (44,400 g/h) obtained from previous experiments.

The quenched product and the quench fluid are collected as a mixture (slurry) of liquid $P_4O_6(l)$ and solid byproducts at the bottom the quench unit. With a hydrocyclone, the slurry is divided into two streams, one is a stream of thickened slurry and the other is a stream of clarified crude $P_4O_6$.

With a filtration unit or a centrifuge, the solid-liquid separation of the thickened slurry leads to a stream of solid byproducts and a stream of liquid crude $P_4O_6$ that contains some soluble byproducts.

The liquid crude $P_4O_6$ stream is purified by an evaporative distillation unit to provide 710 g/h purified product $P_4O_6$, while the soluble byproducts is precipitated from crude $P_4O_6$ to form solid distillation residue at the bottom of the distillation unit.

The solid byproducts obtained in filtration/centrifuge and solid distillation residue are mixed together to form a stream of 177 g/h solid byproducts. This combined solid byproducts stream is fed into an oxidative vaporizer unit (an externally cooled stainless steel chamber), where the solid byproducts stream is oxidized exothermically by contact with a stream of at least 52 g/h oxygen gas ($O_2$) injected into the oxidation vaporizer, and converted into a vaporous byproduct stream containing phosphorus pentoxide ($P_4O_{10}(g)$ and/or $P_2O_5(g)$).

The vaporous phosphorus pentoxide ($P_4O_{10}(g)$, and/or $P_2O_5(g)$) is absorbed into a stream of dilute phosphoric acid $H_3PO_4$ and converted into concentrated phosphoric acid.

The purified $P_4O_6$ product has a purity of greater than 99 weight %. The impurity content of $H_3PO_4$ is less than 0.5%. The total yield on $P_4$ introduced into the reactor unit is >99%.

Example 3: $P_4O_6$ Process with Solid Byproducts Recycle

A stream of liquid elemental phosphorus $P_4(l)$ (396 g/h) is pumped from a phosphorus storage tank (maintained at a temperature of approximately 323K) into a phosphorus evaporator (a tube furnace maintained at around 773K) and converted into vaporous elemental phosphorus $P_4(g)$. The resultant $P_4(g)$ stream, a stream of solid byproducts (obtained from previous experiments) (176 g/h) and a stream of oxygen gas ($O_2$) (384 g/h) are fed into a reactor (an externally cooled or externally plus internally cooled stainless steel chamber), where they react to form a stream of hot reaction product.

The heat removal from the reactor is controlled by the external cooling or external plus internal cooling to ensure that the exit temperature of the hot reaction product stream is maintained at around 1710K so that the dominant species in the hot reaction product is the desired phosphorus trioxide $P_2O_3(g)$.

Upon exiting from the reactor, the hot reaction product stream is quenched in a quench unit by mixing it with a quench fluid, a stream of liquid $P_4O_6(l)$ (44,400 g/h) obtained from previous experiments.

The quenched product and the quench fluid are collected as a mixture (slurry) of liquid $P_4O_6(l)$ and solid byproducts at the bottom of the quench unit. With a hydrocyclone, the slurry is divided into two streams, one is a stream of thickened slurry and the other is a stream of clarified crude $P_4O_6$.

With a filtration unit or a centrifuge, the solid-liquid separation of the thickened slurry leads to a stream of solid byproducts and a stream of liquid crude $P_4O_6$ that contains some soluble byproducts.

The liquid crude $P_4O_6$ stream is purified by using evaporative distillation unit to provide 704 g/h purified $P_4O_6$ product, while the soluble byproducts are precipitated from the crude $P_4O_6$ to form solid distillation residue at the bottom of the distillation unit.

The purified product $P_4O_6$ has a purity of greater than 99 weight %. The $P_4O_6$ yield on $P_4$ introduced into the reactor unit is greater than 99%.

Example 4: $P_4O_6$ Process with Oxidation-Vaporization Step

A stream of liquid elemental phosphorus $P_4(l)$ (400 g/h) is pumped from a phosphorus storage tank (maintained at a temperature of approximately 323K) into a phosphorus evaporator (a tube furnace maintained at around 773K) and converted into vaporous elemental phosphorus $P_4(g)$.

Concurrently, a stream of 177 g/h solid byproducts obtained from previous experiments is fed into an oxidation vaporizer (an externally cooled stainless steel chamber), oxidized exothermically by a stream of oxygen gas $O_2$ (at least 52 g/h) injected into the oxidation vaporizer, and converted into vaporous phosphorus pentoxide ($P_4O_{10}(g)$, and/or $P_2O_5(g)$). (At startup, when solid byproducts are not available for recycle, purchased red phosphorus or the mixture of purchased red phosphorus and purchased $P_2O_5$ may be optionally used in place of solid byproducts.)

The resultant $P_4(g)$ stream and phosphorus pentoxide stream along with a stream of oxygen gas $O_2$ (258 g/h) are injected into a reactor (an externally cooled or externally plus internally cooled stainless steel chamber), where they react into a stream of hot reaction product. The heat removal from the reactor is controlled by the external cooling or external plus internal cooling to ensure that the exit temperature of the hot reaction product stream is maintained at around 1710K so that the dominant species in the hot reaction product is the desired phosphorus trioxide $P_2O_3(g)$.

Upon exiting from the reactor, the hot reaction product stream is quenched in a quench unit by mixing it with a quench fluid and a stream of liquid $P_4O_6(l)$ (44,400 g/h) obtained from previous experiments.

The quenched product and the quench fluid are collected as a mixture (slurry) of liquid $P_4O_6(l)$ and solid byproducts at the bottom the quench unit. With a hydrocyclone, the slurry is divided into two streams, one is a stream of thickened slurry and the other is a stream of clarified crude $P_4O_6$.

With a filtration unit or a centrifuge, the solid-liquid separation of the thickened slurry leads to a stream of solid byproducts and a stream of liquid crude $P_4O_6$ that contains some soluble byproducts.

The liquid crude $P_4O_6$ stream is purified by an evaporative distillation unit to get 710 g/h purified product $P_4O_6$, while the soluble byproducts is precipitated from crude $P_4O_6$ to form solid distillation residue at the bottom of the distillation unit.

The purified product $P_4O_6$ has a purity of greater than 99 weight %. The $P_4O_6$ yield on $P_4$ introduced into the reactor unit is greater than 99%.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above without departing from the scope of the invention, it is intended that all matter contained in the above description and shown in the accompanying drawings shall be interpreted as illustrative and not in a limiting sense.

The invention claimed is:

1. A process for the manufacture of phosphorus (III) oxide, the process comprising:
   in a reactor unit, reacting phosphorus with oxygen, thereby forming an intermediate reaction product stream comprising $P_2O_3$ and one or more byproducts;
   in a quenching unit, quenching the intermediate reaction product stream by contacting with a quenching liquid, thereby forming a reaction product slurry comprising $P_4O_6$ and one or more byproducts;
   recovering the one or more byproducts from the reaction product slurry; and
   in a vaporizer unit, vaporizing the one or more byproducts to form a vaporized recycle stream, wherein the vaporizer unit is separate from the reactor unit; and
   introducing at least a portion of the vaporized recycle stream into the reactor unit.

2. The process as set forth in claim 1, wherein recovering the one or more byproducts from the reaction product slurry comprises:
   separating solid components of the reaction product slurry therefrom, thereby forming a slurry byproduct stream comprising one or more byproducts and a crude product stream comprising $P_4O_6$; and
   drying the slurry byproduct stream.

3. The process as set forth in claim 1, wherein the one or more byproducts of the intermediate reaction product stream comprise: (i) one or more oxides of phosphorus of the general formula $P_xO_y$, where x is from 1-4, and y is from 1-10 and/or (ii) one or more other phosphorus species selected from the group consisting of P, $P_2$, $P_3$, and $P_4$.

4. The process as set forth in claim 1, wherein the one or more byproducts of the reaction product slurry comprise: (i) one or more oxides of phosphorus of the general formula $P_4O_y$, where y is from 7-10, (ii) lower oxides of phosphorus such as $P_4O$, and/or (iii) elemental phosphorus ($P_4$) and red phosphorus (P).

5. The process as set forth in claim 1, wherein the reaction product slurry comprises solid components and solid components are separated therefrom using a solid-liquid separator selected from the group consisting of a hydrocyclone, centrifuge, filtration apparatus, or an evaporative apparatus.

6. The process as set forth in claim 1 wherein the reaction product slurry is heated to a temperature of at least about 400 K to form a thickened product slurry, the slurry byproduct stream being recovered from the thickened product slurry.

7. The process as set forth in claim 1, the process further comprising vaporizing liquid phosphorus prior to its introduction into the reactor unit.

8. The process as set forth in claim 1, wherein the temperature within the reactor unit is controlled by direct cooling of the reactor contents, direct cooling comprising introducing into the reactor unit one or more components selected from a slurry from a previous reaction, $P_4O_6$, or a mixture thereof.

9. The process as set forth in claim 1, wherein the temperature within the reactor unit is controlled by indirect cooling, wherein the reactor unit contains a bundle of heat exchange tubes for transfer of heat from the contents of the reactor unit to a heat transfer medium for removal of heat from the reactor unit.

10. The process as set forth in claim 1, wherein the vaporization of the one or more byproducts within the vaporizer unit is exothermic and the vaporizer unit is cooled by external cooling.

11. The process as set forth in claim 1, wherein the process further comprises introducing an oxygen-containing gas along with the one or more byproducts into the vaporizer unit, wherein the components of the reaction product slurry are vaporized to form a vaporized recycle stream comprising $P_2O_5$ and/or $P_4O_{10}$.

12. The process as set forth in claim 11, wherein:
   the ratio of mass flow rate of the oxygen-containing gas to the mass flow rate of the one or more byproducts introduced into the vaporizer unit is from about 1:10 to about 10:1; and/or
   the temperature of the oxygen-containing gas introduced into the vaporizer unit is at least about 270K; and/or
   the temperature of the one or more byproducts introduced into the vaporizer unit is at least about 270K.

13. The process as set forth in claim 1, wherein the process further comprises introducing an oxygen-containing gas and phosphorus ($P_4$) along with the one or more byproducts into the vaporizer unit, wherein the components of the reaction product slurry are vaporized to form a vaporized recycle stream comprising one or more oxides of phosphorus of the general formula $P_xO_y$, where x is from 1-4, y is from 1-10.

14. The process as set forth in claim 13, wherein:
   the ratio of mass flow rate of the oxygen-containing gas to the mass flow rate of the one or more byproducts introduced into the vaporizer unit is from about 1:10 to about 10:1; and/or
   the ratio of mass flow rate of the phosphorus ($P_4$) to the mass flow rate of the one or more byproducts introduced into the vaporizer unit is from about 1:10 to about 10:1; and/or
   the temperature of the oxygen-containing gas introduced into the vaporizer unit is at least about 270K; and/or
   the temperature of the one or more byproducts introduced into the vaporizer unit is at least about 270K.

15. The process as set forth in claim 2, the process further comprising purifying the crude product stream comprising $P_4O_6$, thereby forming a final $P_4O_6$ product, wherein the final $P_4O_6$ product is characterized by:
- a $P_4O_6$ yield of at least 90% based on the total amount of phosphorus introduced into the reactor unit;
- a $P_4O_6$ purity of at least about 90%; and/or
- an elemental phosphorus ($P_4$) content of no more than about 5 wt %.

16. The process as set forth in any claim 2, the process further comprising:
- distilling the crude product stream comprising $P_4O_6$ within a distillation zone, thereby forming an overheads fraction and a bottoms fraction, the overheads fraction comprising $P_4O_6$ and the bottoms fraction comprising solid byproducts; and
- condensing the overheads fraction to form a liquid $P_4O_6$ product.

17. The process as set forth in claim 16, the process further comprising combining at least a portion of the bottoms fraction comprising solid byproducts with the reaction product slurry.

18. A process for the manufacture of phosphorus (III) oxide, the process comprising:
- in a reactor unit, reacting phosphorus with oxygen, thereby forming an intermediate reaction product stream comprising $P_2O_3$ and one or more byproducts;
- in a quenching unit, quenching the intermediate reaction product stream by contacting with a quenching liquid, thereby forming a reaction product slurry comprising liquid $P_4O_6$ and one or more byproducts;
- separating solid components of the reaction product slurry therefrom, thereby forming a slurry byproduct stream comprising the one or more solid byproducts and a crude product stream comprising liquid $P_4O_6$;
- introducing at least a portion of the slurry byproduct stream into a vaporizer unit, thereby forming a vaporized recycle stream, wherein the vaporizer unit is separate from the reactor unit; and
- introducing at least a portion of the vaporized recycle stream into the reactor unit.

19. A process for the manufacture of phosphorus (III) oxide, the process comprising:
- in a reactor unit, reacting phosphorus with oxygen, thereby forming an intermediate reaction product stream comprising $P_2O_3$ and one or more byproducts;
- in a quenching unit, quenching the intermediate reaction product stream by contacting with a quenching liquid, thereby forming a reaction product slurry comprising $P_4O_6$ and one or more byproducts;
- recovering a first byproduct stream from the reaction product slurry;
- introducing an oxygen-containing gas along with the first byproduct stream into a vaporizer unit, wherein the components of the first byproduct stream are vaporized to form a vaporized recycle stream comprising one or more oxides of phosphorous of the general formula $P_xO_y$, where x is from 1-4, y is from 1-10, wherein optionally phosphorus ($P_4$) is introduced into the vaporizer unit along with the oxygen-containing gas and first byproduct stream, wherein the vaporizer unit is separate from the reactor unit; and
- introducing at least a portion of the vaporized recycle stream into the reactor unit.

20. The process of claim 19, wherein introducing the oxygen-containing gas along with the first byproduct stream into the vaporizer unit further comprises introducing phosphorus ($P_4$) into the vaporizer unit.

21. The process of claim 19, wherein the vaporized recycle stream comprises $P_2O_5$ and/or $P_4O_{10}$.

* * * * *